United States Patent [19]
St. Eve

[11] 3,802,826
[45] Apr. 9, 1974

[54] ROTATABLE CO-EXTRUSION DIE

[75] Inventor: Daniel R. St. Eve, Thornhills, Ontario, Canada

[73] Assignee: National Distillers and Chemical Corporation, New York, N.Y.

[22] Filed: Mar. 31, 1971

[21] Appl. No.: 129,746

[30] Foreign Application Priority Data
Mar. 31, 1970  Canada .................................. 078765

[52] U.S. Cl. ................... 425/462, 425/131, 425/467
[51] Int. Cl. .............................................. B29d 9/00
[58] Field of Search .......... 425/133, 131, 461, 462, 425/467

[56] References Cited
UNITED STATES PATENTS

| | | | |
|---|---|---|---|
| 3,349,437 | 10/1967 | Quackenbush | 425/387 X |
| 3,520,966 | 7/1970 | Soffiantini | 425/133 X |
| 3,275,725 | 9/1966 | Utz | 264/173 X |
| 3,416,982 | 12/1968 | Petzetakis | 425/133 X |
| 2,977,632 | 4/1961 | Bunch | 425/133 X |
| 3,290,727 | 12/1966 | Petzetakis | 425/381 X |
| 3,321,803 | 5/1967 | Corbett | 425/133 X |
| 3,447,204 | 6/1969 | Lainson | 425/133 |

Primary Examiner—J. Spencer Overholser
Assistant Examiner—Ben D. Tobor
Attorney, Agent, or Firm—Allen A. Meyer, Jr.

[57] ABSTRACT

A rotatable coextrusion die for coextruding two or more extrudable materials, as well as a method for extruding such materials through such a die. The die is characterized by being center fed, with a system of center feeding the die and permitting rotation of the die, to improve the roll geometry of the resulting product. In the feeding system, separate streams of the extrudable material are employed, each terminating in a separate flow path, all of the flow paths communicating with a common annular extrusion path, the die rotating about the flow paths at the point where the feeding paths meet the individual flow paths of the die.

7 Claims, 2 Drawing Figures

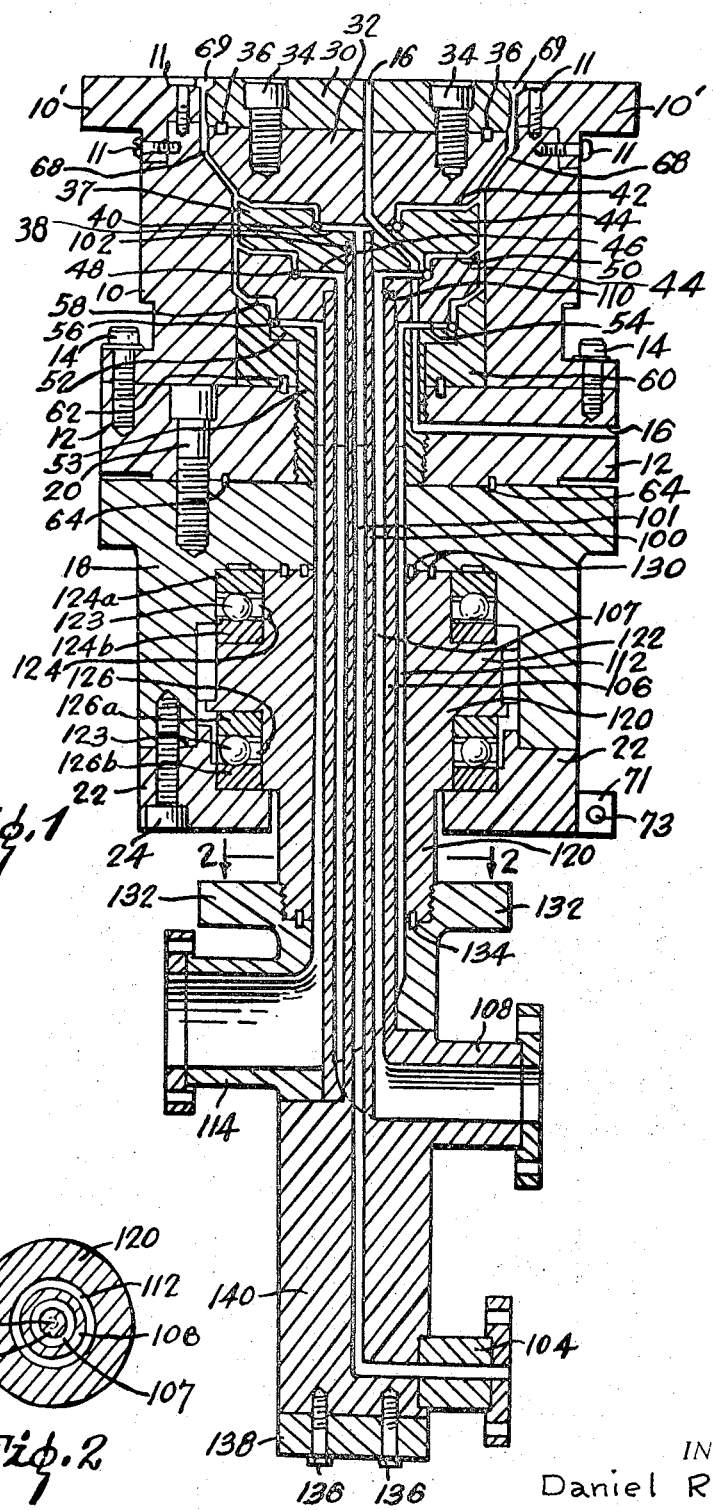

ROTATABLE CO-EXTRUSION DIE

This invention relates to extrusion devices and methods. More particularly, this invention relates to a coextrusion device and method for coextruding two or more layers of extrudable materials, which device and method permits the production of coextruded materials having improved physical characteristics.

Coextrusion devices and methods per se are known in the art, for producing various types of coextrusion materials. Typical of such devices and methods are those illustrated in U.S. Pat. No. 3,266,093 wherein an annular stream of two or more layers are extruded through a die opening, thereafter expanded to form a tube according to conventional blown tube techniques, e.g., as illustrated in Canadian Pat. No. 460,963 and collapsed to form tubing or sheeting as desired.

Typically, in such coextrusion devices and methods, the coextrusion device per se includes a core or centrally mounted body having a hollow annular aperture therein, which may be either in the form defining a hollow tube or with a solid central portion. In the former case, a solid annular stream of material to be extruded is split by a splitter to form an annular ring, which is thereafter extruded, while in the latter case, the hollow annular ring is initially formed and extruded without undergoing any physical change in shape. In either case such devices employ a splitter, usually in the form of a pointed cone, or use a solid core defining with die walls an annular ring aperture. To achieve suspension of the cone or core, supporting means extend through the annular stream to connect with the die body, which supporting means are generally in the form of support bars (usually two or more) which thus extend across the die gap through which the material to be extruded passes. The molten material, after passing over the supporting bars in the cone or core, is split and thereafter flows together to again form a continuous stream. When such material is extruded, it leaves spider lines on the resulting film.

For high quality film and sheeting purposes, films should be free from the lines of joinder which are caused by the supporting means. This is particularly so in the heavier gauges of laminated films which the defect shows up to a greater extent than in the thinner gauge films.

A further requirement associated with high quality film or sheeting is that the products have good roll geometry, meaning that the gauge thickness be of a substantially uniform depth across the width of the product. In the case of coextruding two or more layers of materials to form a laminated product, using the die structures conventionally associated with such procedures, it is not possible to provide the desired degree of gauge control since most common coextrusion devices are generally a one-piece unit, making it impossible to provide gauge control by acting on the coextruded materials.

With the present invention, applicant has developed a device and method wherein two or more layers of extrudable materials may be coextruded through a center-fed unitary coextrusion device to produce coextruded materials having improved gauge thicknesses — i.e., improved roll geometry.

More particularly, in accordance with this invention, there is provided a rotatable coextrusion die comprising an outer die body and feeding means for feeding at least one source of extrudable material, said outer die body having a common annular flow path therein terminating in a die lip, and at least two separate flow paths therein each terminating in said common annular flow path, said feeding means comprising at least two individual feeding means each communicating with one of said separate flow paths, each of said feeding means being adapted to feed an extrudable material to said common paths whereby all of the extrudable materials from each feeding means is combined to form a multi-layered extrudable material, said die body and said feeding means being rotatable relative to one another thereby to control the roll geometry of said multi-layered material.

According to the process of the present invention for producing a coextruded product, the process comprises providing at least two sources of extrudable material in the form of separate streams of each of said materials, causing said streams to flow through separate flow paths, discharging each of said streams into a common annular flow path and combining the streams to form a single stream of material in the flow path whereby one of said streams forms an annular coating on a first annular stream, each of said streams and said combined stream being subjected to relative movement prior to said streams being discharged into a common annular flow path.

In the above coextrusion die, the outer die body most preferably comprises a rotatable die body, rotatable about a fixed axis, having a common annular coextrusion flow path therein, with the flow path terminating in an exterior extrusion lip. Connected to the common annular flow path are at least two individual flow paths in the die body, each terminating in communication with the common flow path. Most desirably each of the individual flow paths are arranged in a staggered relationship to each other in the flow direction of the annular path, whereby an extrudable material from the lowermost individual flow path in the flow direction of the material forms an annular ring of extrudable material, which is coated interiorly with a second extrudable material discharged from the second flow path, and where more than two materials are employed the second material will, in turn, be subsequently coated with further extrudable materials. For the sake of expediency, the die body may be constructed of two portions including an outer shell portion and an inner core portion, with the common annular flow path being defined by an annular gap between the inner core and outer shell portions. The core portion, in such an arrangement, may have the individual flow paths therein, which may be achieved by constructing the core portion with individual die lands with grooves in or between the respective die lands. The core portion in such an arrangement would be integral or fixedly connected to the outer shell portion, thus permitting both the core and outer shell portions to be rotated simultaneously with respect to the non-rotatable portion of the die as hereinafter described.

In an advantageous form, the feed means for the rotatable coextrusion die of the present invention comprises a corresponding number of non-rotatable continuous feed paths to the number of individual flow paths whereby each flow path may be fed separately thus enabling different extrudable materials to be formed into a multi-layered material. To this end, each of the feeding paths is in communication with a respective flow path at one end, and at the other end is adapted to be connected to a source of extrudable material. In a particularly preferred arrangement, the individual feeding means, aligned in a common axis, preferably the axis about which the die is adapted to rotate, are in the form of concentric flow paths separated by suitable means. Such means may be for example, a plurality of concentric hollow tubes mounted within one another to define the continuous feed paths for the respective extrudable materials. In a preferred form, each concentric tube terminates directly with respect to each respective flow path in the rotatable portion of the die, with suitable bearing and sealing surfaces being included to permit rotation of the die about the concentric tubes.

The number of concentric tubes employed may be equal to the number of individual flow paths that the respective feed tubes are adapted to feed; however, there may be one less than the number of flow paths whereby the exterior surface of the outermost feed tube forms the interior wall for the outermost feed path, with the exterior surface of the outermost feed path being defined by the die body and/or suitable mounting means forming a portion of the non-rotatable feeding system. The latter arrangement is preferred for the sake of expediency and economics.

Suitable means are provided for permitting relative rotation between the die body and the feeding means; more particularly, any suitable bearing surface permitting rotation between the respective rotatable and non-rotatable components may be employed. To this end, the feeding system may include suitable mounting and supporting means with one or more bearing surfaces thereon, and one or more movable ball bearing or similar type arrangements included between the respective cooperating engaging surfaces of the die body and feeding means.

The various components for the rotatable coextrusion die of the present invention may be made from materials well known to those skilled in the art and the choice of materials is not critical having regard to the requirements of the various components to withstand heat and/or pressure. Typically, the die body is made out of various types of steels or alloys, with suitable sealing gaskets of, e.g., "TEFLON" or glass-filled "TEFLON" being included to prevent leakage.

Any suitable means may be provided for rotating the outer die body member with respect to the feeding means, such means including, for example, reciprocating means adapted to reciprocate the outer die shell between an initial and terminal point, usually defined by a path of partial rotation of the outer die shell member. In the alternative, means may be provided for continuously rotating the outer die shell about 360°.

From the above, it will be understood that the die body is rotated relative to the feeding means, at the point where the feeding means introduce or feed the respective extrudable materials into the respective flow paths of the die body. This has the advantage that the extrudable material from the respective feeding means is fed into the flow paths with the material being uniformly distributed, which results in improved roll geometry for the extruded material.

It will be understood that the device and process of the present invention could be modified to include more than two flow paths and hence more than two feed streams; in the case of a desired five layered coextruded product, five separate feed streams and five separate flow paths may be employed, etc.

In addition to the process and apparatus of the present invention providing superior and improved roll geometry to coextruded materials, and for providing positive gauge control, the apparatus and process also have the further advantage that they are relatively simple and economical to carry out.

In carrying out the process and employing the coextrusion device of the present invention, the respective materials to be coextruded may be provided by one or more extruders. Extruders per se are well known in the art and suffice it to say that conventional extruders may be employed for this purpose. Typically, in the case of coextruding three layers, each may be of the same material or alternately, may be of different materials in which case separate extruders are employed.

The flow of material to be extruded from an extruder is introduced into the respective inlet conduit under heat and/or pressure, depending on the type of material being employed. In all cases, the flow rate and pressure of the materials being introduced should be maintained below the point at which they could cause turbulence as this has been found to provide undesirable side effects — e.g., if turbulence was created, the coextruded materials would be distorted and would not be as good appearance-wise as if there were no turbulence.

Control of the amount of material being introduced, expressed as the flow rates, may be provided by controlling the amount of flow of the material from the various extruders, so as to provide the desired amount of material.

The types of materials which can be processed according to the present invention may vary widely. A representative list of such materials includes, for example, polyethylene of high, medium or low density, acetal, methyl methacrylate, ethyl cellulose, cellulose acetate, cellulose acetate butyrate, nylon, polypropylene, co-polymerized polyolefins, polyallomer, polycarbonate, poly I butene, polychlorotrifuoroethylene, polytetrafluoroethylene, fluorocarbon, polystyrene, styrene acrylonitrile copolymer, acrylonitrile butadiene styrene terpolymers, vinyl acetate, vinyl alcohol, vinyl butyral, vinyl chloride rigid, vinyl chloride acetate, vinyl chloride elastomeric compounds, rubber extrusion compounds, chlorinated rubber, hard rubber, silicone rubber and compounds, all extrudable thermosetting compounds such as Mylar, phenolics and epoxies, cellophane and paper pulp compounds.

With reference to the above-mentioned compounds, there use is intended to denote that the various additives associated with the utility of such resins may be included as desirable. Thus, various anti-slip, anti-block, etc. additives may be employed.

The present invention can be used to produce laminated products in which any or all of the individual layers of extrudable substances are non-self-supporting but in which the total product preferably is self-supporting. The total thicknesses of the individual layers may range from 0.0002 inch to 0.015 inch. Combined, the total number of layers may form a film having a thickness of between 0.0004 inch to about 0.020 inch. It will be understood that the layers may be of different thicknesses.

The choice of materials depends on the nature of the product desired. It suffices to say that the choice is for those skilled in the art. In general, the choice of materials can be such that each is compatible with the other to form a non-separable laminate; alternately, the materials may be shown so that they are indirectly compatible, and will be susceptible to delamination. Such combinations are desirable and useful in providing layer bags or similar containers.

Following formation of the annular stream and extrusion from the die lip, the resulting coextruded material may then be processed according to the conventional techniques for blown tube extrusion as for example illustrated in Canadian Pat. No. 460,963 showing inflation of the molten stream; subsequent collapse after cooling and winding-up of the resulting tube.

The products produced by the present invention may either be in the form of tubing or sheeting, in the latter case the tubing is normally slit following cooling, again according to conventional techniques. The coextruded materials may be post-treated for various purposes as for example, treatment by electrostatic discharge processes to render the products susceptible to further coating with, for example, ink.

Having thus generally described the invention, reference will now be made to the accompanying drawing, illustrating a preferred embodiment and in which FIG. 1 is a vertical section taken through a representative die according to the present invention; and FIG. 2 is a section taken only along the line 2—2 of FIG. 1.

Referring first to FIG. 1, the unitary die structure of this invention includes an outer body portion rotatable about a fixed central axis comprised of an upper outer body portion 10 rigidly connected to an outer annular intermediate body portion 12 by means of, e.g., bolts 14. The portion 10 may include outer ring 10' secured by means of bolts 11 thereto, the latter permitting minor adjustments to be made between the ring 10' and a core portion 30 for positioning purposes. Air conduit 16, extending through the body portion 12, provides a source of controllable pressurized air for use following the coextrusion of the materials for production of tubing according to conventional blown tube techniques.

Fixedly connected to the intermediate body portion 12 is an outer lower body portion 18, e.g., by means of bolts indicated by reference numeral 20; with an outer bottom body closure portion 22 fixedly secured to body portion 18 by means of, e.g., bolts 24.

The rotatable portion of the coextrusion device also includes a rotatable core (rotatable with the outer die body about a fixed axis) which in the embodiment shown is complementary to and forms with the body portion 10 and ring 10' a common annular extrusion flow path indicated generally by reference numeral 68. To this end, the core includes an upper portion indicated by reference numeral 30 fixedly connected to a first mating land portion 32 by means of bolts 34, with a circumferentially extending sealing ring 36 extending therebetween. Rigidly connected to the first land portion 32 is a second land portion 37 by means of, e.g., bolts. The second land 37 defines, by means of common grooves with land 32, a plurality of interconnected feed apertures or flow channels 38 terminating in an annular groove 40, which in turn connects with an annular groove 42 forming a discharge flow path for a first extrudable material.

Rigidly connected by, e.g., means of screws (not shown) to the second die land 37, is a third die land 44. The die lands 37 and 44 define therebetween, by means of common grooves, a plurality of feed apertures 46 terminating in the flow direction, in a circumferentially extending annular groove 48 forming a second material flow path. The latter flow path in turn, communicates with a further annular discharge groove 50 thus forming a discharge flow path for a second extrudable material.

The rotatable core also includes a third resinous material flow path consisting of a plurality of interconnected feed channels 54 terminating in an annular feed groove 56. In turn, the feed groove 56 connects with a further annular groove 58 forming a discharge flow path for the third resinous material source. The interconnected feed channels 54 and the annular groove 56 are defined by common grooves in the third die land portion 44 and the top flange portion 52 of a threaded bushing 53. The discharge feed groove 58, connected with the annular groove 56, is formed by common grooves in the third die land portion 44 and the upper portion of a stepped seating ring 60. The seating ring 60 is fixedly connected to the upper die body portion 10 by suitable means (not shown) — e.g., screws, and also to the third die land 44 by, e.g., screws (not shown), thus making it rotatable with the outer die components and hence rotatable about a fixed axis. An annular sealing ring 62 is located between the lower portion of the seating ring 60 and the intermediate die portion 12 for sealing purposes.

All three discharge grooves 42, 50 and 58 communicate with the common annular extrusion flow path 68, and as will be seen from the drawing are introduced, in the flow direction of the various materials, upstream from one another — i.e., in a staggered rlationship. Thus, material discharged from the groove 58 is coated with the material from the discharge groove 50, which in turn is coated with material from the discharge groove 42 with the combined material flowing in the common annular extrusion flow path 68, and subsequently being discharged through the die lip indicated by reference numeral 69.

The outer rotatable die body may include any suitable means for causing the rotatable components to be rotatable about a fixed axis. Thus, for example, a suitable mounting member 71 provided with an aperture 73 therein, may be rigidly connected to, e.g., the lower body portion 22 to receive a mating arm of, e.g., a reciprocating device (not shown) or a rotator (not shown) to effect rotation.

The feeding system for the device of the present invention, which is shown in the drawings as being nonrotatable with respect to the above-described rotatable portions of the device, includes a first hollow axial conduit 100 defining a passageway or path 101 communicating at one end with the feed channels 38. A gasket 102 of suitable material is located between conduit 100 and the die land 37 forming a seal and a bearing surface against which the rotatable portion of the die rotates with respect to the conduit 100. The other end of the conduit 100 is connected to a flange 104 adapted to mate with the outlet port of an extruder (not shown).

A second hollow conduit 106, concentric with conduit 100, defines a hollow passageway 107, communicating with feed groove 50 at one end, and at the other, with an aperture in a flange 108 adapted to mate with the outlet port of an extruder (not shown). Gasket 110 seals the gap between the end of conduit 106 and the die land 44, in addition to forming a bearing surface against which the die land 44 rotates.

A third supply passageway is indicated by reference numeral 112, the passageway 112 communicating with the feed channels 54 at one end, and at the other with an aperture in flange 114 adapted to mate with the outlet port of an extruder (not shown).

The passageway 112 is concentric with the passageway 107, and in this embodiment, is defined by the exterior surface of the conduit 106 and various portions of the nonrotatable body and the rotatable body, as now defined. More particularly, the lower portion of the passageway 112 is defined by a non-rotatable cylindrical supporting and mounting sleeve member 120, and the upper portion by the rotatable intermediate die body 18. One or more sealing gaskets 64 between the upper body portion 12 and the intermediate body portion 18 are included to prevent leakage.

To permit relative rotation between the rotatable components of the die body and the non-rotatable feeding system, there is provided a pair of spaced upper and lower roller bearing bushings 124 and 126 mounted between the intermediate die portion 18 and a laterally projecting flange 122 of the cylindrical sleeve 120, and between the lower body portion 22 and the flange 122. Bushings 124 and 126 are of the type which include upper and lower tracks for ball bearings such as those indicated by reference numeral 123 between the tracks. Thus, for example, in bushing 124 the upper portion indicated by reference number 124a rotates with the rotatable portion of the die, and the bottom portion 124b does not rotate. The reverse is true with the lower bushing 126 wherein the upper portion 126a is stationary and the bottom portion 126b rotates.

Sealing gaskets 130 are provided for effecting sealing against leakage of the extrudable material between the rotatable and non-rotatable portions of the body.

The lower portion of the sleeve 120 threadably engages a non-rotatable mating member 132, with an annular sealing ring 134 being located therebetween. The bottom of the die includes bolts 136 which serve to anchor a cap portion 138 to the bottom extension 140 of the non-rotatable portion.

In the drawings, it will be understood that a preferred embodiment has been illustrated and that the die disclosed may be modified without departing from the spirit and scope of the invention. More particularly, for example, this invention contemplates that the core portions 30 and 32 may be one piece or as illustrated may be composed of separate portions, and that various conventional techniques may be employed in the die construction.

The embodiments of the invention in which an exclusive property or privilege is claimed are defined as follows:

1. A center fed rotatable coextrusion die comprising an outer die body and a central core rotatable about a fixed central axis, said core forming with said outer die body an outer common annular coextrusion flow path terminating in an extrusion lip, said core being mounted within said outer die body for simultaneous rotation with said outer die body about said fixed axis, said core also including at least first and second horizontally disposed flow paths therein, each of said flow paths being in the form of a plurality of axial grooves extending outwardly from the center of the core and each groove terminating in communication with said common annular flow path, an inner non-rotatable core including at least first and second vertically disposed feed paths for extrudable material, each of said feed paths terminating in individual communication with one of said horizontally disposed flow paths, and means for permitting rotation of said outer rotatable shell and said core about said fixed axis with respect to said inner non-rotatable portion.

2. A rotatable coextrusion die as defined in claim 1, comprising a rotatable die body and non-rotatable feeding means, said die body having a common annular flow path therein terminating in a die lip, and at least two separate individual flow paths terminating in said common annular flow path, said separate flow paths terminating in said common path in a staggered relationship to each other in the flow direction of said common path, said die body being rotatable about a fixed axis, said feeding means comprising a corresponding number of continuous feed paths to said individual flow paths, one end of each of said continuous feed paths communicating with one of said individual flow paths, the other end of each of said continuous feed paths being adapted to be connected to a source of extrudable material, said feed paths extending in a common axial direction, and means for permitting rotation of said die body with respect to said feeding means about said fixed axis.

3. The apparatus of claim 2, wherein said feeding means comprises at least two concentric hollow tubes of a diminishing diameter, said tubes being mounted in operative relationship each to a respective horizontally disposed flow path and being mounted in sealing relationship with respect to said central rotatable core whereby extrudable material flows into said flow paths from the respective tubes, the interior of the innermost tube and the space between said concentric tubes constituting said first and second vertically disposed flow paths, said central rotatable core being mounted for rotative movement upon the upper extremities of said concentric hollow tubes.

4. The apparatus of claim 3, wherein the number of concentric tubes corresponds to the number of flow paths.

5. The apparatus of claim 3, wherein the number of tubes is one less than the number of flow paths, and wherein the exterior of the outermost tube and the die form an outermost flow path.

6. The apparatus of claim 3 wherein the central rotatable core is constituted by a number of land portions fixedly secured in superimposed relationship, the axial grooves constituting said flow paths being located between the opposed surfaces of adjacent land portions.

7. The apparatus of claim 6 wherein the upper extremity of said outer concentric hollow tube is received within and constitutes a bearing surface for the lowest of said land portions and the upper extremity of said inner concentric hollow tube is received within and constitutes a bearing surface for the next higher land portion.

* * * * *